May 18, 1926.
H. L. MERRICK
DASHPOT
Original Filed August 12, 1922
1,584,884
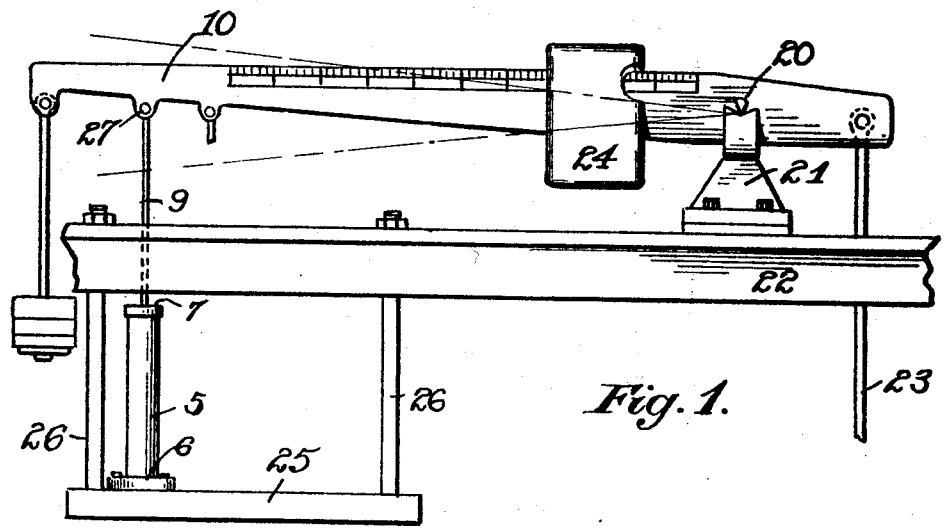
Fig. 1.
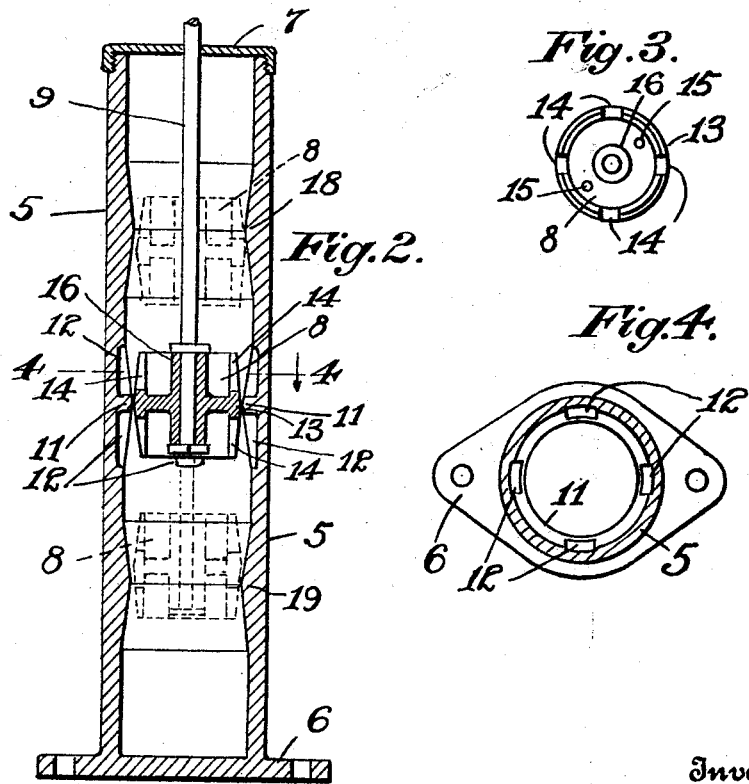
Fig. 2.
Fig. 3.
Fig. 4.
Inventor
Herbert L. Merrick
By his Attorney Patented May 18, 1926.

1,584,884

UNITED STATES PATENT OFFICE.

HERBERT L. MERRICK, OF PASSAIC, NEW JERSEY.

DASHPOT.

Original application filed August 12, 1922, Serial No. 262,316. Divided and this application filed March 31, 1924. Serial No. 703,328.

This invention relates to dash pots for use in connection with apparatus to prevent too sudden movement in some part of the apparatus, the present application being a division of my co-pending application filed August 12, 1922, Serial No. 262,316, and it is the object of the invention to provide an improved device of this character which is simple and cheap in construction and highly efficient and sensitive in use, the same being particularly adapted for use in connection with automatic weighing mechanism, as set forth in my co-pending application hereinbefore referred to, to steady and prevent chattering of the scale beam as the counterpoise is moved along the beam and approaches the point of perfect balance, although it is applicable for use in connection with other kinds of apparatus.

In the drawing accompanying and forming a part of this specification, Figure 1 is a front elevation of a portion of weighing mechanism showing a scale beam with my invention applied thereto and the mounting thereof.

Figure 2 is a longitudinal sectional view of the dash pot.

Figure 3 is an end view of the plunger or piston forming a part of the dash pot; and Figure 4 is a cross sectional view of the cylinder of the dash pot, taken substantially on the line 4—4 of Figure 2 looking in the direction of the arrow.

Similar characters of reference designate like parts throughout the different views of the drawing.

The embodiment of the invention illustrated in the drawing comprises a liquid carrying casing or cylinder 5 closed at the bottom and arranged at said end with a laterally projecting flange 6 having perforations for the engagement of securing means, such as bolts or the like, for mounting the cylinder on a fixed support. The upper end of the cylinder is open and has a removable closure 7 with a perforation centrally thereof. A piston or plunger 8 is reciprocably carried in the cylinder by a rod 9 extending through the perforation in the closure 7 and whereby the piston is connected to the movable part of the apparatus, such as the scale beam 10 of a weighing mechanism as in my co-pending application herein referred to and to which reference may be had, to restrain such part from having too sudden or violent movement and steady the movement thereof, the piston being moved by and in accordance with the movement of said moving part.

The dash pot is of a particular construction and arrangement to provide a more efficient device of this character. To accomplish this result the inner wall of the cylinder is arranged with a restricted annular portion or annulus 11 located substantially midway between the ends with recesses 12 arranged in the wall of the cylinder at opposite sides of the annulus, which recesses are in the nature of by-pass ports. The major portion of the piston 8 is of less diameter than the cylinder but has an enlarged annular portion 13 substantially midway between the ends thereof, that is, it is of greater diameter at this portion, the wall of the piston converging or inclining toward the axis and from opposite sides of said annular enlarged portion, as clearly shown in Figure 2, such enlarged portion being of a diameter to permit the same to have a sliding fit with the cylinder annulus 11. The wall of the piston at opposite sides of the annulus 13 is arranged with recesses 14 cut through the ends of the piston wall to cooperate with the cylinder recesses 12 to by-pass the liquid from the cylinder at one end of the piston to the opposite end thereof. The piston has restricted ports 15 in a web located in a plane with the annulus 13, which web is arranged with a hub 16 whereby the piston is mounted upon its actuating rod 9. The ports 15 permit a restricted flow of liquid from the cylinder at one end of the piston to the opposite end of the piston during the movement thereof. The inner wall of the cylinder 5 is also arranged with restricted annular portions 18 and 19 at substantially equal distances from and at opposite sides of the annulus 11.

In the use of the dash pot in connection with weighing mechanism embodying a scale beam fulcrumed or pivotally supported, as at 20, in a bearing 21 mounted upon the shelf 22 of the frame work of the weighing mechanism, and having a load support, such as a platform, connected thereto by a rod 23 passing through an opening in the shelf 22, the load being counterbalanced by a counterpoise 24 adjustable along the beam.

The dash pot is mounted by means of the flange 6 upon an auxiliary shelf 25 suspended below the shelf 22 by rods 26. The piston rod 9 passes up through an opening in the shelf 22 and is pivotally connected to the scale beam, as at 27, adjacent the extremity of the long end of the beam and along which the counterpoise is adjustable.

In operation the connection of the piston with the moving part of an apparatus, such as the scale beam 10, is such so that the enlarged annular portion 13 of the piston is in register with the central cylinder annulus 11 when the beam is in position of equilibrium. As the piston moves upward there will be a momentary resistance to the movement thereof, the passage of the liquid from the cylinder at one end of the piston to the opposite end being only through the restricted ports 15, but as the enlarged piston portion 13 is moved out of register with the cylinder annulus 11 the piston recesses 14 will come in register with the cylinder recesses 12 permitting of an increased flow of the liquid past the piston, and as the piston moves upward due to the gradual restricting of the cylinder above the cylinder recesses 12 there will be a gradual decrease of flow of liquid past the piston, and as the piston approaches the restricted cylinder portion 18 the flow of the liquid past the piston is restricted and thereby the movement of the piston retarded, the flow of liquid being only through the restricted piston ports 15. As the piston is brought to position of equilibrium the enlarged piston portion will be in register with the cylinder annulus 11 increasing the resistance to the movement of the piston, the only passage of the liquid from one end of the piston to the opposite end being through the restricted ports 15 and should there be any tendency of the beam or other moving part to which the piston rod is connected to vibrate upward or downward this will be checked by the resistance of the liquid as the only passage of the liquid will be through the restricted piston ports.

Should the piston be moved suddenly downwardly the piston will coact with the restricted cylinder portion 19 in a manner similar to that above described in connection with the restricted cylinder portion 18, and as the piston moves to position of equilibrium any tendency to move the piston upward from such position will be retarded by the enlarged piston portion coming into register with the cylinder annulus 11 as above described.

Having thus described the invention I claim:

1. A dash pot comprising a liquid carrying cylinder having annular restricted portions, and a piston to reciprocate in the cylinder, said piston being of less diameter than the cylinder to reciprocate in the cylinder and having an annular enlarged portion with relation to the remainder of the piston and said enlarged portion being substantially of the same diameter as the restricted portions of the cylinder.

2. A dash pot comprising a liquid carrying cylinder having a restricted annular portion centrally thereof, and a piston reciprocable in the cylinder of less diameter than the cylinder for the major portion thereof and having an annular enlargement of substantially the same diameter as the restricted portion of the cylinder.

3. A dash pot comprising a liquid carrying cylinder having a restricted annulus intermediate the ends thereof with recesses in the cylinder wall at opposite sides of said annulus, a piston of less cross sectional dimension for the major portion thereof than the cylinder reciprocable in the cylinder and having a laterally enlarged portion intermediate the ends, and recesses in the piston wall at opposite sides of said enlarged portion.

4. A dash pot comprising a liquid carrying cylinder having an annular portion restricted in diameter in relation to the remainder of the cylinder, a piston of less cross sectional dimension than the cylinder to reciprocate in said cylinder having an annular enlarged portion relative to the remainder of the piston and of substantially the same dimension as the restricted portion of the cylinder, and by-pass ports in the walls of the cylinder and piston.

5. A dash pot comprising a liquid carrying cylinder having an annular portion restricted in relation to the remainder of the cylinder with recesses in the cylinder wall extending longitudinally thereof at opposite sides of said restricted portion, a cylindrical piston to reciprocate in said cylinder of less diameter for the major portion thereof than the cylinder, said piston intermediate its ends being enlarged to substantially the same diameter as the restricted portion of the cylinder and having a transverse web arranged with restricted perforations for the purpose specified.

6. A dash pot comprising a liquid carrying cylinder having an annular restricted portion intermediate its ends, recesses extending longitudinally of the wall of the cylinder at opposite sides of said restricted portion, a cylindrical piston having a portion intermediate its ends of substantially the same diameter as the restricted portion of the cylinder with the walls of the piston at opposite sides of said enlarged portion converging outwardly, and the piston having a transverse web arranged with restricted perforations, and a rod to carry and reciprocate the piston in the cylinder.

7. In a dash pot, a liquid carrying cylinder having an annular restricted wall portion intermediate the ends thereof, with recesses arranged in the cylinder wall at opposite sides of said restricted wall portion, and a piston having to reciprocate in the cylinder having a part substantially of the same diameter as the restricted cylinder portion with recesses arranged at opposite sides of said piston part and restricted ports therethrough for the purpose specified.

8. In a dash pot, a liquid carrying casing having a restricted portion intermediate the ends thereof and restricted portions arranged at equidistant points at opposite sides of said intermediate restricted portion, recesses in the casing wall at opposite sides of the intermediate restricted portion, and a piston having restricted ports therethrough to reciprocate in the piston.

Signed at Passaic, in the county of Passaic and State of New Jersey, this 7th day of March, 1924.

HERBERT L. MERRICK.